Figure 1:
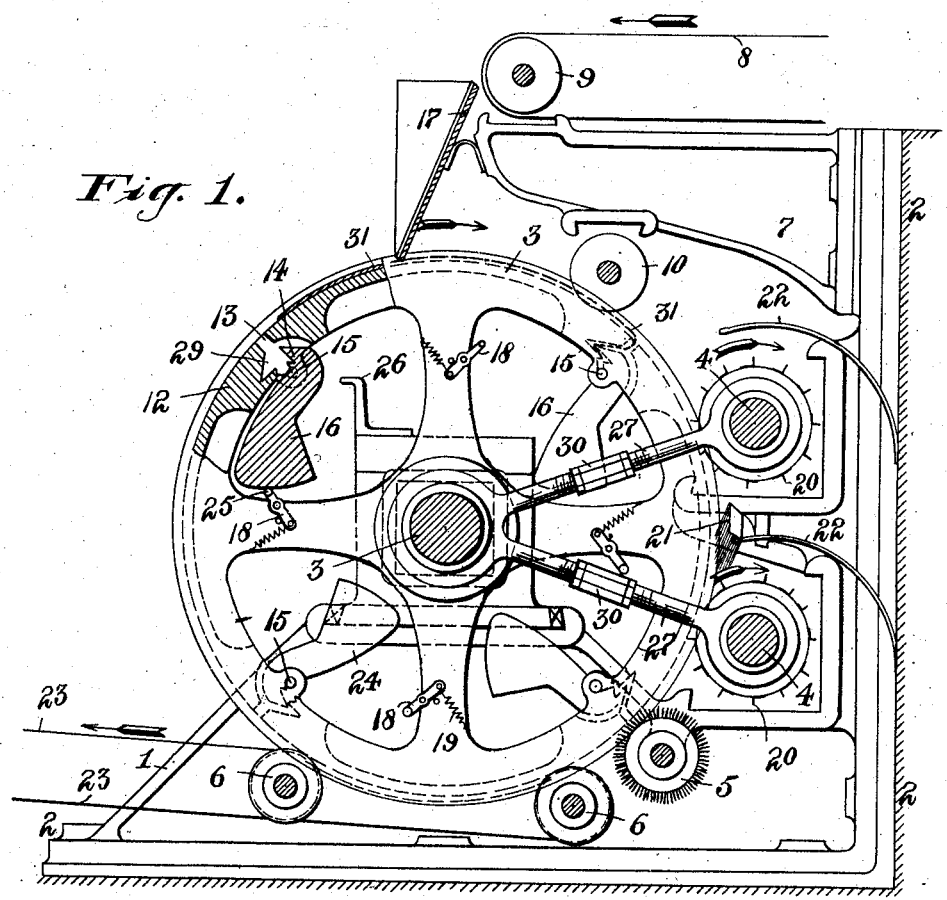

No. 772,823. PATENTED OCT. 18, 1904.
G. M. E. POS.
MACHINE FOR DECORTICATING FIBERS.
APPLICATION FILED SEPT. 19, 1902.
NO MODEL. 2 SHEETS—SHEET 1.

Witnesses:—

Inventor:—
Gerrit Marie Elize Pos.
by Alexander & Co.
Attorneys

No. 772,823. PATENTED OCT. 18, 1904.
G. M. E. POS.
MACHINE FOR DECORTICATING FIBERS.
APPLICATION FILED SEPT. 19, 1902.
NO MODEL. 2 SHEETS—SHEET 2.
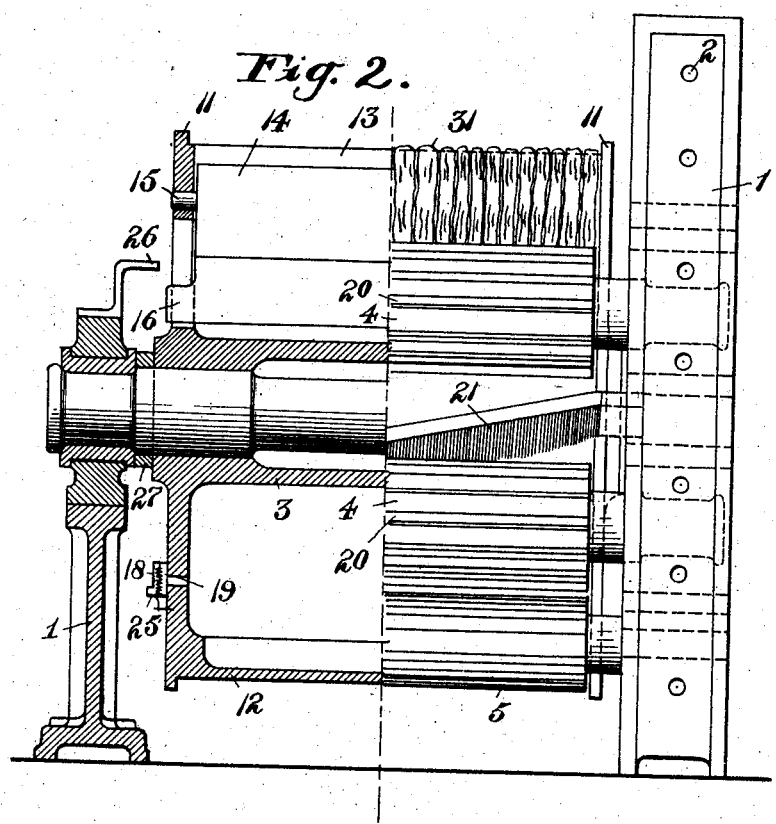
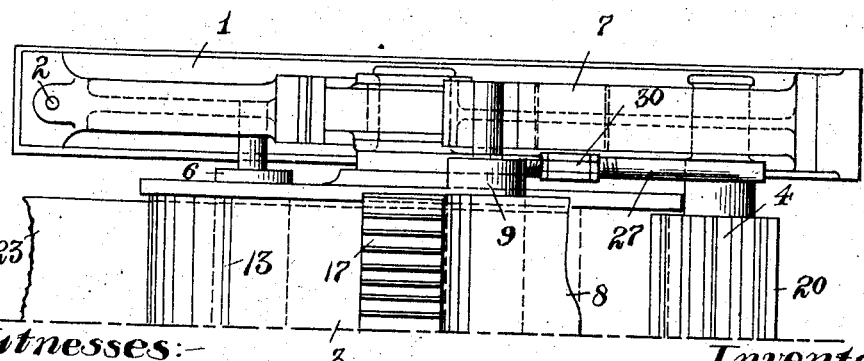
Witnesses:—
J. P. McGirr
H. van Heerenbrinck
Inventor:—
Gerrit Marie Elize Pos.
by Alexander & Co.
Attorneys No. 772,823. Patented October 18, 1904.

UNITED STATES PATENT OFFICE.

GERRIT MARIE ELIZE POS, OF AMSTERDAM, NETHERLANDS.

MACHINE FOR DECORTICATING FIBERS.

SPECIFICATION forming part of Letters Patent No. 772,823, dated October 18, 1904.

Application filed September 19, 1902. Serial No. 124,097. (No model.)

*To all whom it may concern:*

Be it known that I, GERRIT MARIE ELIZE POS, a subject of Her Majesty the Queen of the Netherlands, residing at Amsterdam, Netherlands, have invented a certain new and useful Machine for Decorticating Fibers, of which the following is a specification.

This invention relates to an improved machine for decorticating the fibers contained in such tropical plants as the ramie or chinagrass, aloe, agave, and the like, the object being to produce a machine which is more efficient and economical in working than those at present in use. As is well known, it is necessary for this purpose that the skin of the stalks and the flesh of the leaves be removed. In the appliances hitherto known the leaves and stems to be cleaned are fastened onto a reciprocating table, and thus exposed to the action of knives. With these decorticating - machines, however, continuous working is impossible. The laying on and removal of the leaves takes time, and during this interval the knives are not in work. The capacity of these machines is small, and the working is neither uniform nor free from shock. For example, it is scarcely possible to keep the knife in the correct position toward the leaves under treatment, and therefore the latter are acted upon too little at one moment and too much at another.

The present invention relates to a decorticating-machine in which these defects are obviated. With this object the reciprocating table is replaced by a rotating one in the shape of a drum, on the outside of which are stretched the leaves to be cleaned. This drum is mounted in a frame which also supports the bearings of the two decorticating-drums.
The arrangement for keeping the leaves in tension is automatic in action, the clamps for the purpose being constructed in such a manner that they are loosened at the proper moment and then closed again as soon as the fresh leaves are laid on.

One form of machine constructed according to the invention is represented in the accompanying drawings.

Figure 1 is a side elevation, partly in section; Fig. 2, a rear view, partly in section, and Fig. 3, a part plan.

The frame 1 is of great strength throughout and is set in masonry by strong foundation-bolts 2. In this frame are carried the various drums and rollers used in the decortication—namely, the drum 3, which forms the rotating table, the two decorticating-drums 4, the revolving brush 5, and the two drums 6 guiding the discharge-belt 23. Brackets 7, carried by the frame, are provided for the pressure-roller 10 and the drum 9 guiding the feed-belt 8.

For the sake of clearness in the drawings the driving-gear actuating the various drums is omitted, as the motion may be transmitted in the usual manner by means of gear-wheels and belting.

The periphery 12 of the drum 3 is provided at both sides with projecting rims 11, between which work the knives of the decorticating-drum 4 and which serve to prevent the leaves being thrust laterally beyond the surface of the drum. The periphery of the drum is provided over nearly its full width with slots 13, which connect with cavities 29, cast in the periphery. (See Fig. 1.) In these cavities are the clamps 14, pivoted on pins 15 on the periphery 12, and which clamps are formed at their lower extremities as weights 16. These weights control the clamps in such a manner that said clamps are brought into action as soon as the ends of the leaves or stalks to be cleaned are inserted into the slots 13, the clamps being automatically loosened again when the decorticated leaves have arrived at the discharge-belt 23.

A sloping hopper 17, divided into as many compartments as the number of leaves that can find room side by side on the surface of the drum, Figs. 1 and 3, serves for feeding the drum 3 by introducing the leaves or stalks into the slots 13.

The motion of the weights 16 is controlled by levers 18, which are pivoted on the end spokes of the drum, Figs. 1 and 2, in such a manner that the weights do not come into action until the studs 25 on the levers 18 strike against the fixed contact-piece 26 on the machine-frame, Figs. 1 and 2. The levers 18 are yieldably held against stops by means of the springs 19.

Both the decorticating-drums 4 are mounted in the vertical portion of the frame 1 and symmetrically with regard to the rotating drum 3. The position of the decorticating-drums 4 with respect to the drum 3 is adjusted by the rods 27, the ends of which grip the axes of the drums 3 and 4 and the length of which can be accurately adjusted by means of the nut 30.

The decorticating-drums 4 are fitted with bronze or suitable metal knives 20 in the usual manner.

Between the two drums 4 are arranged inclined brushes 21, mounted on the machine or carried by the same in some way that will allow them some elasticity. These brushes 21 incline downwardly from the ends of drum 3 toward its middle, and so serve to sweep the thinner portions of the tips of the leaves (which have only been partly decorticated by the drum 4) toward the middle of the said drum 3. On account of their elasticity the brushes 21 slide over the thicker parts of the leaves that have been decorticated by the first drum 4. It will be seen that as the brushes slide over said thicker portion and sweep together the thinner portions of the leaves the latter portions are brought together into strips or layers of the same thickness as the thicker parts and so the thinner parts will be fully decorticated by the action of the second drum 4. The flying particles of loosened material, such as the pulp from the leaves, are caught by hoods 22, carried by the frame, and discharged from the machine.

Before the decorticated leaves are discharged by the belt 23 any adherent particles of pulp are removed by the cylindrical brush 5.

The operation is as follows: The leaves to be cleaned are fed to the machine by the belt 8, on which the attendant lays them straight and side by side longitudinally with the tips rearward. The leaves then fall into the hopper 17, so that the leaves are fed separately to the drum, their ends being inserted into the slit 13 as soon as the latter is brought under the hopper 17 by the rotation of the drum 3. The next moment the projecting stud 25 of lever 18 strikes against the fixed contact-piece 26, thus causing the weight 16 to pivot about the pin 15 and forcibly push the clamp 14 into the cavity 29. In so doing the clamp carries the ends of the leaves along with it and clamps them firmly, as shown at the right-hand upper side of Fig. 1. The drum 3 continues to rotate slowly, during which movement the leaves 31 lay themselves down on the surface and are pressed thereon by the pressure-roller 10. The leaves 31 then pass the upper roller 4 and are almost completely decorticated thereby. Next the inclined brushes 21 come into action, their elasticity allowing them to slide over the thicker parts that have already been decorticated, but push toward the center of the drum-surface the thinner portions at the tips of the leaves. These latter portions are then decorticated in passing by the lower decorticating-roller, the thickness of the layer having been increased by the sweeping action just performed. The now completely decorticated leaves are next cleaned by the revolving brush 5 and afterward pass along the belt 23 and out of the machine. Just before this point the weight 16 comes into play and again swings on the pivot 15, thus taking up the position indicated by 24 in Fig. 1. The weight falls down onto the lever 18, its descent being checked gradually by the spiral spring 19, although rubber buffers may also be arranged inside the drum-frame to take up the impact of the swinging weight at this point. The clamp 14 is thus loosened, the ends of the stalks are liberated once more, and in consequence of the friction of the belt 23 the stalks or leaves will be drawn out of the slots 13 and be carried away by such belt.

In the construction illustrated in the drawings the rotating drum 3 is arranged to take four rows of leaves in succession, and the periphery will therefore measure four times the length of a leaf or stalk.

The machine possesses the following advantages over those hitherto in use: First, the capacity is considerably greater, since the work is continuous and there is no loss of time in removing the decorticated leaves and feeding the machine with a fresh supply; secondly, the machine can be worked by one attendant, who has merely to lay the leaves properly on the feed-belt 8 and see that they are correctly inserted into the slots 13; thirdly, the direct connection of the rotating drum 3 with the two decorticating-drums 4, by means of the rods 27, insures smooth and perfect working and enables the desired distance between the knives 20 and the leaves under treatment to be accurately adjusted and maintained, and, fourthly, the introduction of the sloping brushes 21 between the two knife-drums 4 insures the perfect decortication of the leaves.

What I claim is—

1. In a decorticating-machine, and in combination, a drum forming a table for the leaves to be treated, clamping devices carried by said drum, decorticating-drums, means for accurately adjusting them with respect to the main drum, and a brush for cleaning the fibers from the pulp substantially as described.

2. In a decorticating-machine, and in combination, a drum forming a table for the leaves to be treated and having slots and cavities therein, a clamping device located in each cavity, means for automatically putting same in and out of action on the upper and lower sides of the drum respectively, decorticating-drums, means for adjusting their position with respect to the main drum, brushes between said drums for sweeping the fibers together and a rotary brush for cleaning the fibers after decorticating substantially as described.

3. In a decorticating-machine, and in combination, a drum forming a table for the leaves to be treated and having slots and cavities therein, a clamping device located in each cavity, means for automatically putting the same in and out of action on the upper and lower sides of the drum respectively, decorticating and cleaning means for acting on the leaves on the drum, rollers beneath the drum, and a belt carried by such rollers for frictionally acting on the leaves carried by the drum and for removing the same therefrom when their clamping device is released substantially as described.

4. In a decorticating-machine the combination with a drum, of clamping devices located in cavities within the drum and means for automatically releasing the same whereby they will close by their own weight on the leaves in the upper position of the drum and such that when in the lower position they will open and release the leaves, and means for withdrawing the leaves therefrom substantially as described.

5. In a decorticating-machine, the combination with a drum having slots and cavities therein, of a clamping device in such cavity comprising a pivoted clamping-piece 14, a weight 16, carried thereby, a pivoted lever 18 carried by the drum, a spring for maintaining the same in position, said lever being adapted to hold the clamp open in a certain position of the drum, and a fixed lever 26 adapted to strike lever 18 and release the clamp so that it will close by its weight substantially as described.

6. In a decorticating-machine and in combination, a drum forming a table for the leaves to be treated, decorticating-drums around the same, means for supporting the same, and inclined brushes between such drums whereby the thinner parts at the tips of the leaves not cleaned by the first decorticating-drum are brushed together to be treated by the second substantially as described.

7. In a decorticating-machine and in combination, a drum forming a table for the leaves to be treated, a clamping device carried by said drum, decorticating-drums around the main drum, means for supporting the same thereon, a hopper over the main drum divided into compartments and means for feeding the leaves to be treated to said hopper substantially as described.

In testimony whereof I have hereunto set my hand in the presence of two subscribing witnesses.

GERRIT MARIE ELIZE POS.

Witnesses:
   THOMAS HERMANUS VERHAVE,
   AUGUST SIEGFRIED DOCEN.